Patented July 30, 1940

2,209,452

UNITED STATES PATENT OFFICE 2,209,452

SEPARATION AND SEGREGATION OF OLEFINS

Edwin R. Gilliland, Cambridge, Mass., assignor to Standard Oil Development Company, a corporation of Delaware No Drawing. Application December 29, 1938, Serial No. 248,236

6 Claims. (Cl. 260—677)

This invention relates to improvements in the segregation of unsaturated hydrocarbons and relates particularly to improvements in the absorption and the separation of olefins having 2 to 4 carbon atoms to the molecule from mixtures of olefins and paraffins.

It is known that cuprous salts in solution react with unsaturated hydrocarbons. Berthelot, Ann. Chim. Phys., 23, 32–39 (1901) disclosed that ethylene was absorbed by hydrochloric solutions of cuprous chloride. Manchot and Brandt in 1909 disclosed that ethylene at atmospheric pressure was absorbed by such a solution to the extent of one molecule for each molecule of cuprous chloride, forming a meta-stable compound which is empirically $CuCl.C_2H_4$. Ethylene is also known to react with ammoniacal cuprous chloride solutions, and several patents have been granted for the recovery of ethylene by absorption in ammoniacal solutions.

A reaction of an olefin with solid cuprous chloride was first disclosed by Tropsch and Mattox in the Journal of American Chemical Society, 57, 1102–3 (1935). They disclosed that ethylene reacts with solid cuprous chloride at high pressures, giving an addition compound $CuCl.C_2H_4$ which decomposes slowly at 25° C. and rapidly at 100° C. The equilibrium pressure of ethylene over the compound was disclosed to range from 2.14 atmospheres at 0° C. to 19.49 atmospheres at 40° C. They stated that propylene did not react, and that ethylene could be selectively recovered from mixtures of ethylene and ethane and of ethylene and propylene, but not in stoichiometric proportions.

Co-pending application Serial No. 248,235, filed December 29, 1938, by Edwin R. Gilliland in the U. S. Patent Office, discloses that other olefins, such as propylene, isobutylene, etc., will combine mol for mol with a solid cuprous halide, such as cuprous chloride, bromide, iodide, or fluoride, yielding highly dissociated compounds such as $CuCl.C_3H_6$ and $CuCl.i-C_4H_8$, or $CuBr.C_3H_6$ and $CuBr.i-C_4H_8$, etc. When solid cuprous halides are used as absorbents, it is necessary to use low temperatures, such as −10° to −60° F. or lower and/or high pressures. In forming these compounds, the reaction proceeds very slowly, as it was found very difficult to maintain the low temperatures due to the heat of formation and also in the recovery of the absorbed olefin, the reaction is very slow as it is difficult to supply the heat of dissociation.

An object of this invention is to provide means whereby the heat of formation may be readily removed and heat of dissociation readily supplied.

Another object of this invention is to provide means where the time of contact required to absorb an olefin in a cuprous halide is materially lessened.

It has now been discovered that, by suspending the cuprous halide in an organic solvent, such as saturated hydrocarbons of high boiling point with which the cuprous halide is not reactive, the period of time required to effect the formation of the addition compound with the cuprous halide is reduced. For example, ethylene, when in contact with cuprous chloride at a temperature of about 25° C. and at a pressure of about 17 atmospheres, requires about 24 hours to complete the reaction, even though the cuprous chloride was finely divided and mixed with inert materials such as pumice to obtain better contact. When the finely-divided cuprous chloride is suspended in an organic solvent such as kerosene, the reaction is completed in about ¼ of an hour. This is also true when propylene or isobutylene is contacted with solid cuprous chloride. The cuprous halides that were found to be most effective are cuprous chloride and cuprous fluoride, although cuprous bromide and cuprous iodide were also found capable of forming addition compounds with the mono-olefins. The increased rate of formation is due both to the improved contact of the olefin with the cuprous salt and to the improved heat removal which allows the reaction to proceed. The proportions of inert solvent that are used are from 1 to 10 parts of solvent for each part of the cuprous halide salt. The slurry of cuprous salt with the addition compound can likewise be readily heated to recover the olefin. The time of recovery of the olefin is likewise reduced proportionately as the slurry is readily raised to a higher temperature.

The invention is not to be limited to the specific embodiments shown or the specific examples given, nor to any theories advanced as to the operation of the invention, but in the appended claims it is intended to claim all inherent novelty in the invention as broadly as the prior art permits.

I claim:

1. Improvements in the separation of mono-olefins from materials less reactive with cuprous halides, which comprise contacting a mono-olefin with a cuprous halide suspended in a solvent with which the said cuprous halide is not reacted under suitable conditions of temperature and pressure to form a cuprous halide-olefin addition compound, separating the cuprous halide and the addition compound formed therein from unreacted materials, subjecting the separated mixture to heat and recovering mono-olefins.

2. Improvements in the separation of mono-olefins from saturated hydrocarbons, which comprise contacting a mixture of saturated hydrocarbons and mono-olefins with a slurry of a cuprous halide in an inert solvent liquid under suitable conditions of temperature and pressure to form a cuprous halide-olefin addition compound, separating the reaction product of the cuprous halide and the mono-olefin from the saturated hydrocarbons, subjecting the reaction product of cuprous halide and mono-olefin to heat to recover the mono-olefins.

3. Improvements in the separation of mono-olefins from materials less reactive with cuprous chloride, which comprise contacting a mono-olefin with cuprous chloride suspended in a solvent with which the said cuprous chloride is not reacted under suitable conditions of temperature and pressure to form a cuprous chloride-olefin addition compound, separating the cuprous chloride and the addition compound formed therein from the unreacted materials, subjecting the separated mixture to heat and recovering mono-olefins.

4. Improvements in the separation of mono-olefins from saturated hydrocarbons, which comprise contacting a mixture of saturated hydrocarbons and mono-olefins with a slurry of cuprous chloride in an inert organic solvent liquid under suitable conditions of temperature and pressure to form a cuprous chloride-olefin addition compound, separating the reaction product of the cuprous chloride and the mono-olefin from the saturated hydrocarbons, subjecting the reaction product of cuprous chloride and mono-olefin to heat and recovering the mono-olefins.

5. Improvements in the separation of mono-olefins from saturated hydrocarbons, which comprise contacting a mixture of saturated hydrocarbons and mono-olefins with 1 part of solid cuprous chloride and 1 to 10 parts of an inert solvent liquid under suitable conditions of temperature and pressure to form a cuprous chloride-olefin addition compound, separating the reaction product of the cuprous chloride and the mono-olefins from the saturated hydrocarbons, subjecting the reaction product of cuprous chloride and mono-olefin to heat to recover the mono-olefins.

6. Improvements in the separation of mono-olefins from saturated hydrocarbons, which comprise contacting a mixture of saturated hydrocarbons and mono-olefins with 1 part of cuprous chloride and 1 to 10 parts of kerosene under suitable conditions of temperature and pressure to form a cuprous chloride-olefin addition compound, separating the reaction product of the cuprous chloride and the mono-olefins from said saturated hydrocarbons, subjecting the reaction product of cuprous chloride and mono-olefin to heat to recover the mono-olefins.

EDWIN R. GILLILAND.